United States Patent
Degen et al.

(10) Patent No.: US 11,960,858 B2
(45) Date of Patent: Apr. 16, 2024

(54) PERFORMANCE BASED SYSTEM CONFIGURATION AS PREPROCESSING FOR SYSTEM PEFORMANCE SIMULATION

(71) Applicant: Siemens Aktiengesellschaft, Munich (DE)

(72) Inventors: Heinrich Helmut Degen, Plainsboro, NJ (US); Arun Ramamurthy, Plainsboro, NJ (US); Yunsheng Zhou, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/637,826

(22) PCT Filed: Aug. 26, 2020

(86) PCT No.: PCT/US2020/047865
§ 371 (c)(1),
(2) Date: Feb. 24, 2022

(87) PCT Pub. No.: WO2021/041455
PCT Pub. Date: Mar. 4, 2021

(65) Prior Publication Data
US 2022/0283784 A1 Sep. 8, 2022

Related U.S. Application Data

(60) Provisional application No. 62/893,394, filed on Aug. 29, 2019.

(51) Int. Cl.
*G06F 8/10* (2018.01)
*G06F 8/20* (2018.01)
(Continued)

(52) U.S. Cl.
CPC .............. *G06F 8/10* (2013.01); *G06F 8/24* (2013.01); *G06F 8/34* (2013.01); *G06F 8/70* (2013.01); *G06F 11/3409* (2013.01)

(58) Field of Classification Search
CPC ..... G06F 8/10; G06F 8/24; G06F 8/34; G06F 8/70; G06F 11/3409
(Continued)

(56) References Cited

U.S. PATENT DOCUMENTS

| | | | |
|---|---|---|---|
| 6,941,249 B1 * | 9/2005 | Miller | G05B 17/02 703/7 |
| 7,239,991 B2 * | 7/2007 | Tuszynski | G05B 17/02 703/2 |

(Continued)

OTHER PUBLICATIONS

Mahmoud et al, "A Simple Approach to Modeling and Simulation of Photovoltaic Modules", IEEE, pp. 185-186 (Year: 2012).*
(Continued)

*Primary Examiner* — Anil Khatri (57) ABSTRACT

System for performance-based design space composition in engineering systems includes design configuration module, explainable recommendation module and user interface module. A list of one or more system configurations is generated, each system configuration having a unique set of components that satisfy system goals and system requirements. For each system configuration, system performance values are determined based on performance enabled by each system component. A design dashboard presents the system configurations in rank order and the system performance value for each of the system configuration components.

10 Claims, 5 Drawing Sheets

(51) Int. Cl.
*G06F 8/34* (2018.01)
*G06F 8/70* (2018.01)
*G06F 11/34* (2006.01)

(58) Field of Classification Search
USPC .................................................. 717/101–135
See application file for complete search history.

(56) References Cited

U.S. PATENT DOCUMENTS

| | | | | |
|---|---|---|---|---|
| 7,783,467 | B2* | 8/2010 | Son | G06F 30/33 |
| | | | | 716/108 |
| 8,032,329 | B2* | 10/2011 | Chou | G06F 11/348 |
| | | | | 703/22 |
| 8,370,797 | B2* | 2/2013 | Khan | G06F 8/51 |
| | | | | 716/108 |
| 8,548,777 | B2* | 10/2013 | Sturrock | G06N 20/10 |
| | | | | 703/22 |
| 8,843,909 | B2* | 9/2014 | Tondreau, Jr. | G06F 8/45 |
| | | | | 717/130 |
| 8,930,919 | B2* | 1/2015 | Bhaskara | G06F 8/76 |
| | | | | 717/137 |
| 9,489,630 | B2* | 11/2016 | Achin | G06N 5/02 |
| 9,678,628 | B2* | 6/2017 | Gohr | G06F 3/0482 |
| 9,747,396 | B1* | 8/2017 | Chatterjee | G06F 11/3466 |
| 10,466,978 | B1* | 11/2019 | Vidan | G06N 7/01 |
| 10,496,935 | B2* | 12/2019 | Sachdev | H04L 41/145 |
| 10,503,631 | B1* | 12/2019 | Talluri | G06F 11/3636 |
| 10,635,078 | B2* | 4/2020 | Tanimoto | G05B 17/02 |
| 10,678,973 | B2* | 6/2020 | Chuang | G06F 30/27 |
| 10,970,067 | B1* | 4/2021 | Gupta | G06F 8/20 |
| 11,531,763 | B1* | 12/2022 | Gupta | G06F 21/577 |
| 11,663,115 | B2* | 5/2023 | Xiao | G06F 11/3684 |
| | | | | 717/124 |
| 11,675,333 | B2* | 6/2023 | Bandara | G05B 19/41 |
| | | | | 700/98 |
| 2007/0150254 | A1 | 6/2007 | Choi et al. | |
| 2022/0108185 | A1* | 4/2022 | Venugopalan | G06F 30/27 |

OTHER PUBLICATIONS

Liu et al, "Applying Knowledge-Based System Design and Simulation in Information System Requirements Determination", ACM, pp. 407-411 (Year: 1990).*
Faily et al, "Guidelines for Integrating Personas into Software Engineering Tools", ACM, pp. 69-74 (Year: 2013).*
Eigler et al, "Tool-Based Software Engineering Education for Software Design Patterns and Software Architecture Patterns—a Systematic Literature Review", ACM, pp. 153-161 (Year: 2023).*
Baxter, Design Reuse and Scale: Keys to Practical Code Generation and Large Scale Software Maintenance, IEEE, pp. 1-3 (Year: 2000).*
Chang-ai et al, "Architecture Framework for Software Test Tool", IEEE, pp. 40-47 (Year: 2000).*
International Search Report corresponding to PCT application No. PCT/US2020/047865; 4 pages.

* cited by examiner

PERFORMANCE BASED SYSTEM CONFIGURATION AS PREPROCESSING FOR SYSTEM PEFORMANCE SIMULATION

TECHNICAL FIELD

This application relates to engineering design software. More particularly, this application relates to a user interactive engineering software tool for generating performance based system configurations as preprocessing for system performance simulation.

BACKGROUND

The purpose of Systems Engineering (including Software Engineering) is the design of a system, with its system architecture and system elements, which meets the defined system goals. The overall performance of a system is the result of its subsystem and how they interact. The performance consideration applies to all levels of a system (e.g., system, subsystem, component). Also, the increase of a performance of a system element may increase the performance of the entire system.

Today, the process of designing systems and subsystems is highly manual and usually requires many time consuming iterations of manual simulation setups and simulation operations by simulation software to achieve a design that meets performance objectives for the system. If it was known during the initial system design which system elements most significantly contribute to system performance, a candidate system design for the simulation setup could be chosen more efficiently, greatly reducing the number of simulation iterations. The determination of the resulting system performance for each system elements prior to simulation is a time consuming, manual process. Moreover, when complex systems are modeled for simulation to predict performance of a candidate design, a virtual model is generated and the simulation software can take days to complete a single simulation and produce the results. Many systems engineering projects require multiple iterations of simulation setup, simulation, and redesign, which extends the time consumption even further. With simulation cycles costing so greatly in time consumption, there is ever a need for assuring the simulation setup provides a strong candidate for system configuration, and that the simulation setup be accelerated and optimized, thereby reducing the number of simulation cycles.

SUMMARY

A system and method for performance-based system design configuration generation for simulation setup includes an explainable recommendation module configured to generate a list of one or more system configurations, each system configuration comprising a unique set of components that satisfy system goals and system requirements. The system configurations are based on received seed designs and specification of system design requirements. For each system configuration, system performance values are determined based on performance enabled by each system component. The system configurations are ranked according system performance values. A design dashboard presents the system configurations in rank order, and for each system configuration, the system performance value for each of the system configuration components.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed for an engineering design system that automatically determines performance based system component selections for optimum simulation setup in systems engineering projects. A graphical user interface presents predicted performance of system components for a candidate system design prior to system performance simulation. Unlike conventional systems engineering systems, the disclosed solution automatically performs a multivariate evaluation of candidate design components for a system design based on multiple design goals and performance requirements to predict a performance score for each contributing component of a proposed system configuration and a ranked list of system configurations, from which top ranked system configurations can be used for setup of a performance simulation. An advantage of the performance based evaluation process is reducing design performance simulation iterations by improving selection of system configuration components for simulation setup.

The disclosed system automatically (1) determines the system performance predictions for various system design configurations; (2) determines predicted system performance per system component; (3) selects, for a simulation setup, system components which are compatible and enable a maximum system performance per system design; (4) offers system element options in response to evaluation results having lower system performance; (5) displays a request prompt for all components of a system configuration with a resulting system performance lower than the maximum system performance prediction—this identifies which system components are "performance constraining", permitting a refocused effort toward better system components for simulation setup and ultimately an accelerated system design simulation.

Figure 1:
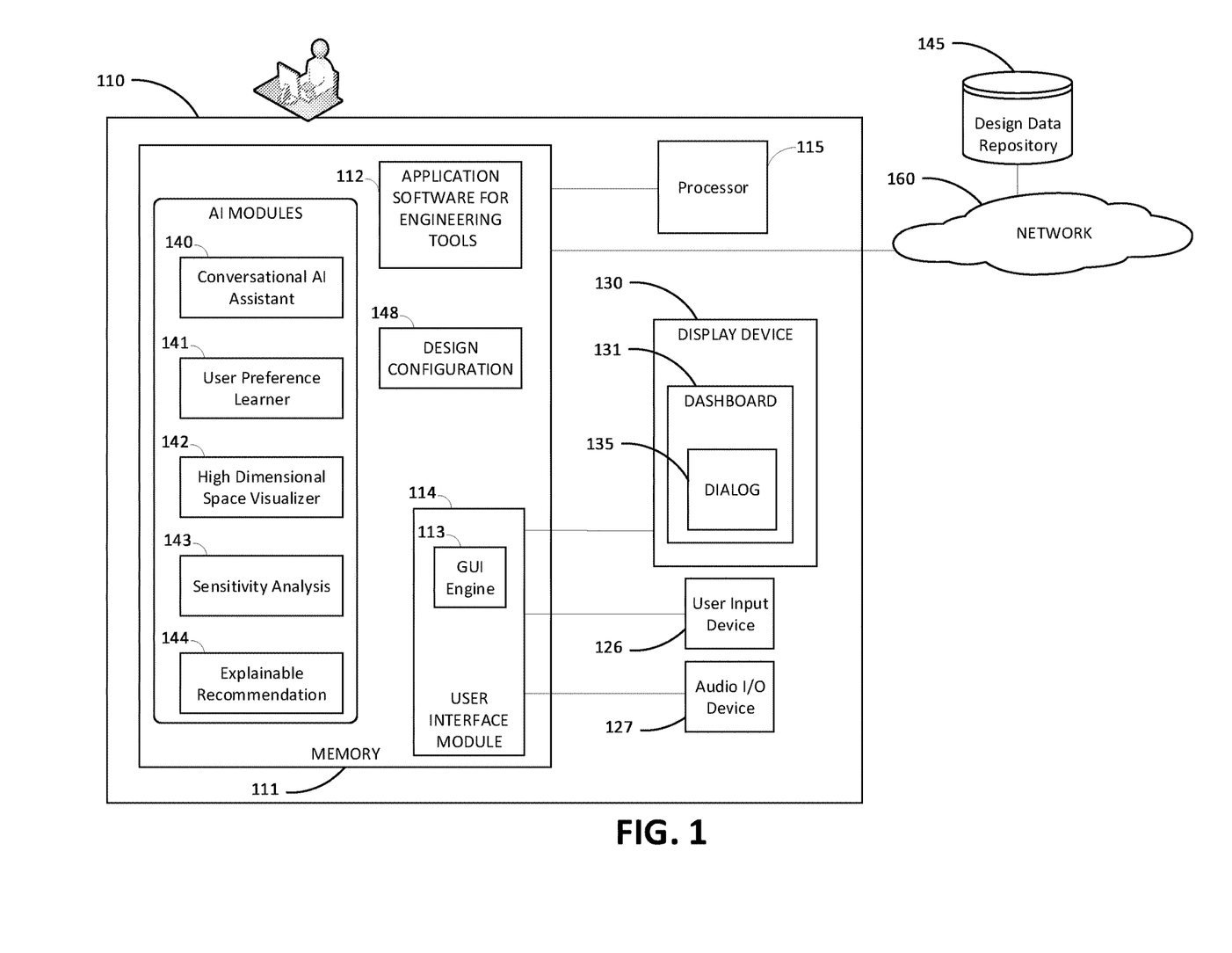
FIG. 1 shows an example of a system for a performance-based system design configuration process as preprocessing for optimal system performance simulation in accordance with embodiments of this disclosure.

FIG. 1 shows an example of a system for a performance-based system design configuration process as preprocessing for optimal system performance simulation in accordance with embodiments of this disclosure. In an embodiment, a design engineering project is performed for a target object or system. A computing device 110 includes a processor 115 and memory 111 (e.g., a non-transitory computer readable media) on which is stored various computer applications, modules or executable programs, including AI modules 140-144 and design configuration module 148. Engineering applications 112 may include software for one or more of modeling tools, a simulation engine, computer aided design (CAD) tools, and other engineering tools accessible to a user via a display device 130 and a user interface module 114 that drives the display feed for display device 130 and processes user inputs back to the processor 115, all of which are useful for performing computer aided design. The design engineering tools 112 may perform CAD operations such as in the form of 2D or 3D renderings of the physical design, and system design analysis, such as high-dimensional design space visualization of design parameters, performance parameters, and objectives. A network 160, such as a local area network (LAN), wide area network (WAN), or an internet based network, connects computing device 110 to a repository of design data 145.

In an embodiment, engineering data generated by application software for engineering tools 112 is monitored and organized into system design data stored by design data repository 145. System design data are the accumulation of system elements and element properties exported from engineering tools 112 over the course of design projects and design revisions. In some embodiments, system design data of elements are obtained from a supplier, such as a vendor or manufacturer of components related to the system under design. For example, system design data may include technical design parameters, sensor signal information, operation range parameters (e.g., voltage, current, temperature, stresses, etc.). In instances of simulations performed by engineering tools 112, simulation result data may be attached to system design data for respective elements, which is useful for selection of competing design elements. As a practical example, battery performance for different batteries can be recorded over several simulations of various designs for a battery powered drone. In other aspects, tests and experiments of prototypes can yield system design data that can be attached to design elements in the system design data and stored in design data repository 145. Hence, the design repository 145 may contain structured and static domain knowledge about various designs.

AI modules 140-144 are provided to improve engineering systems design efficiency and to significantly reduce design cycle time by presenting intuitive context-specific design comparisons and recommendations that enables rapid decision-making, and by using a conversational style to aid designers in navigating complex design spaces in a collaborative and concurrent manner. An integrated design environment is provided that enables engineers from different disciplines to share knowledge and support the design effort of others while providing a quick and easy decision-making capability in joint multi-domain multi-disciplinary design problems.

Conversational AI Assistant module 140 is an algorithmic module for design space navigation, and configured to operate an interactive dialog box allowing direct access to desired content of system design information using a multimodal dialog manager that guides the user through context-based question-clarification mechanism.

User preference learner module 141 is used for design space exploration and configured to generate user specific recommendations based on inferring user preference and providing an interactive an intuitive interface for the review of he recommended designs.

High dimensional space visualizer module 142 and sensitivity analysis module 143 are used for design space construction. High dimensional space visualizer module 142 is configured to provide visual representation of automatically constructed design spaces and multi-domain design constraints/relationships making identified "regions" of dependencies and indicating aggregated metrics per region. Indications of expected improvements to the system performance resulting from exploration of the region are realized by developing embedded representations of the design space. Sensitivity analysis module 143 is configured to compute sensitivities of component performance to design parameters.

Explainable recommendation module 144 is used for design composition and is configured to generate a list of automatically constructed designs highlighting ones that have failed to evaluate and a list of recommendations of how to repair these designs. These capabilities are realized by generating an ordered rank of composition rules and generating explainable recommendations for modifications based on user-specified traces and standard errors generated by executable files.

As shown in FIG. 1, the AI modules 140-144 are deployed locally on computing device 110. However, in some embodiments, one or more AI modules may be deployed as cloud-based or web-based operations accessible via network 160. In an aspect, AI modules 140-144 provide an active interface for the user while one or more engineering tools 112 runs in the background, allowing the user to perform both inquiries and modifications to the design using a system design view, without having to toggle two or more software applications during the design activities. As such, a user can indirectly operate application software for engineering tools 112 through the graphical user interface generated by GUI engine 113 as driven by the AI modules 140-144.

In an aspect, depending on the task, one or more of the AI modules 140-144 manage the engineering tools 112 operating in the background. For example, a user may interact directly with a graphical user interface (GUI) (presented to the user on display device 130 as dashboard 131 and design dialog box 135) for a request of design component analysis. AI modules then communicate the request to the design space controlled by an engineering tool 112, which executes the analysis in the background and returns results back to the AI modules to be analyzed and translated for presentation to the user through the GUI.

Design configuration module 148 is configured to receive seed designs and a specification of requirements for a system design from data repository 145, and generates various and unique combinations of system components as a set of system design configurations. Each system design configuration includes a unique set of components that satisfy user-defined system goals and system requirements.

User interface module 114 provides an interface between the system application software modules 112, 120 and user devices such as display device 130, user input device 126 and audio I/O device 127. Design dashboard 131 and design dialog box 135 are generated as an interactive GUI by GUI engine 113 during operation and rendered onto display device 130, such as a computer monitor or mobile device screen. User input device 126 receives user inputs in the form of plain text strings using a keyboard or other texting mechanism. User requests for design data can be submitted to the conversational AI assistant 140 as a plain text string in the design dialog box 135 while viewing aspects of the system design on the design dashboard 131. Audio device 127 may be configured with a voice sensor (e.g., microphone) and a playback device (audio speaker). Vocal user requests can be received by audio device 127 and processed by user interface module 114 for translation to a text string request, which may be displayed in the dialog box. Conversational AI assistant 140 is configured to translate the test string request, map the request to system design data, and retrieve a design view from the design repository 145. From the retrieved data, conversational AI assistant 140 extracts response information and generates a dialog response in the form of a plain text string for viewing in design dialog box 135, a voice response for audio play to the user on audio device 127, or a combination of both. The design dashboard 131 is configured as graphical display of design view elements (e.g., a 2D or 3D rendering) with properties and metrics related to the design view elements generated by the engineering application 112.

Conversational AI assistant 140 is configured for translation functionality, performing conversion of design space object context into conversational dialog and vice-versa. Various translational algorithms may be applied, such as automatic speech recognition (ASR), natural language understanding (NLU), natural language generation, and text-to-speech, depending on the modality of the dialog. User inputs during the system design process are processed in a conversational form for an improved user experience, allowing the designer to explore and find design alternatives with reduced interaction complexity and cognitive load. An advantage of processing queries posted at the user interface in a conversational form eliminates the need for learning and/or memorizing a complex interaction language, reducing cognitive load for the designer.

Figure 2:
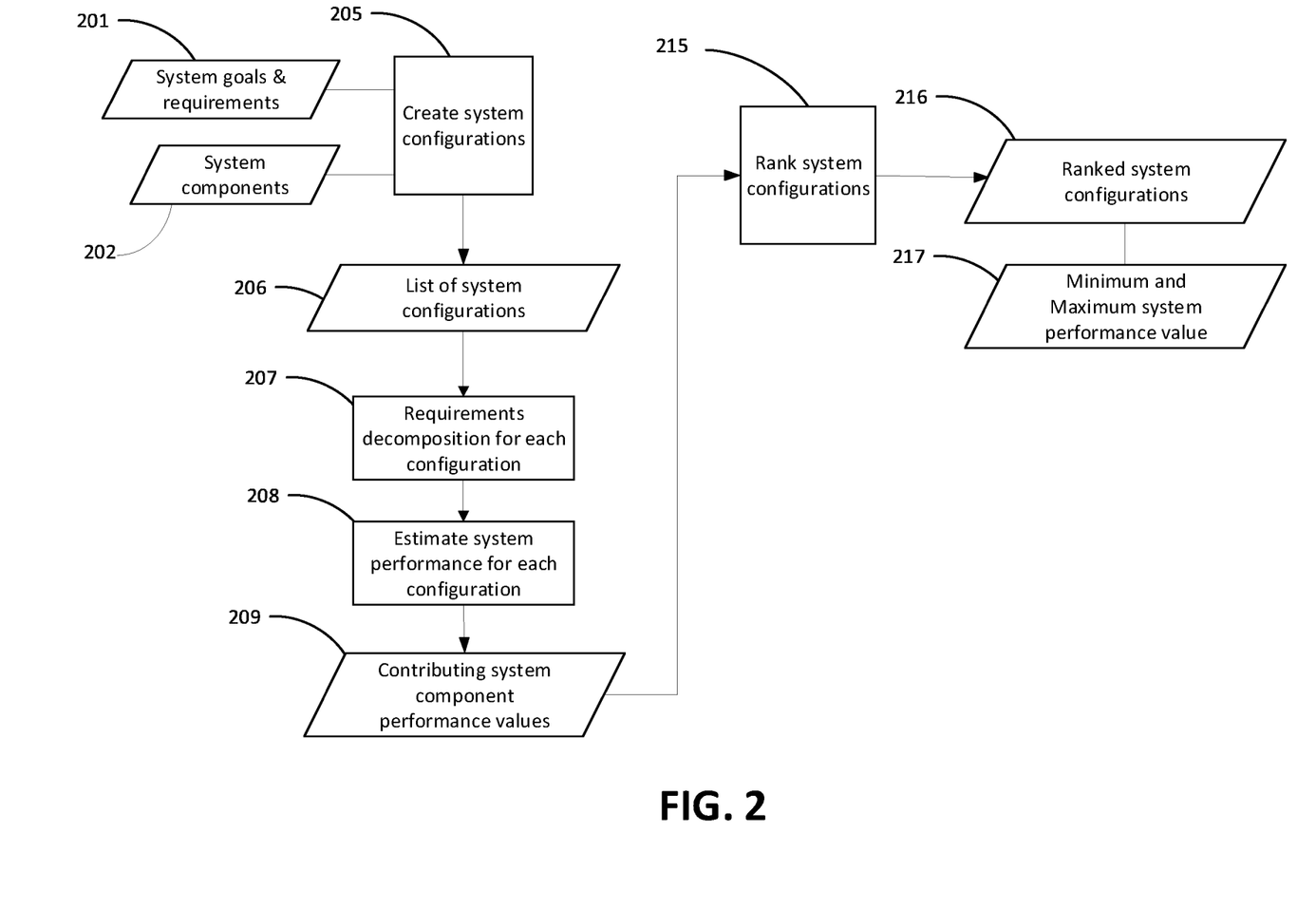
FIG. 2 shows a flowchart example of a performance-based system design configuration process as preprocessing for optimal system performance simulation in accordance with embodiments of this disclosure.
Figure 3:
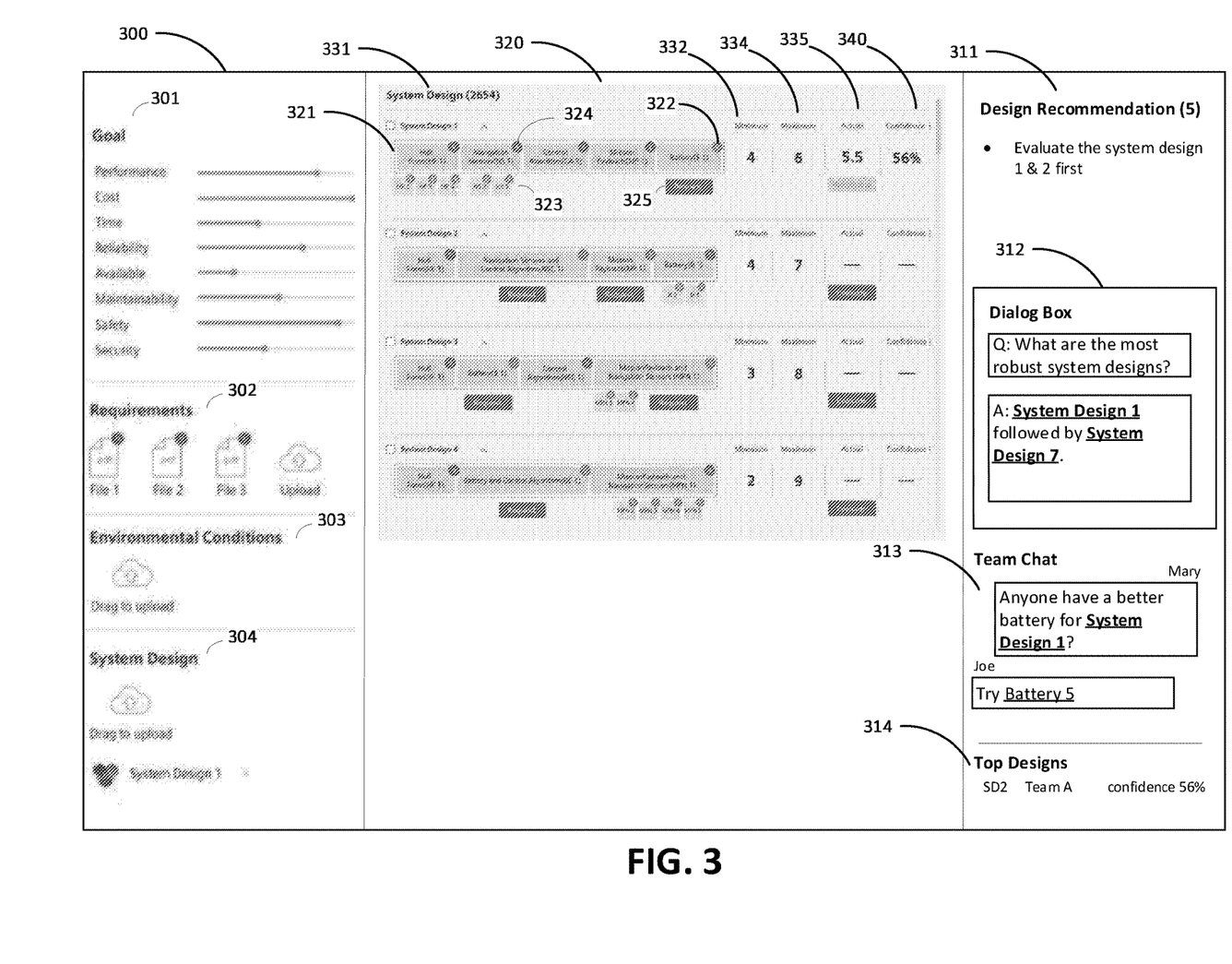
FIG. 3 shows an example of an interactive dashboard for display and modification of performance based system configurations in accordance with embodiments of the disclosure.

FIG. 2 shows a flowchart example of a performance-based system design configuration process as preprocessing for optimal system performance simulation in accordance with embodiments of this disclosure. FIG. 3 shows an example of an interactive dashboard for display and modification of performance based system configurations in accordance with embodiments of the disclosure. As shown in FIG. 2, system goals and requirements 201 are retrieved from a storage repository, such as design data repository 145. For example, during design space construction, a user, such as a design engineer, may submit goals and requirements for the system using a GUI application, which are stored in a data repository. As shown in FIG. 3, a GUI dashboard 300 provides an interactive area 301 in which a user may prioritize a set of system configuration goals (e.g., by setting a slidable scalar for each goal) including but not limited to performance, cost, and time. Requirement files 302 contain various requirement data uploaded to the AI modules for the analysis. In an embodiment, the setting of goals may be higher than minimum system requirements, and the system configuration performance estimates may define performance rating scores on a discrete linear scale (e.g., such as [1, 2, 3, 4, 5, 6, 7, 8, 9, 10]). For example, an aggregated minimum requirement (based on all system requirements) may be derived as a first score value (e.g., value of 2), an aggregated goal for the system is a score of 5, and any score between 6 and 10 exceeds the aggregated goal and aggregated requirement. In such an example, system performance estimate scores may range between a minimum performance score and a maximum performance score, and the results may be compared to the requirement score and goal score.

System components 202 may be retrieved from seed designs stored in a data repository, stored by a user during design space construction. Design configuration module 148 creates multiple system configurations 205 using different combinations of system elements 202. Each system configuration comprises a unique set of compatible system components which can interact with each other to realize an effective system. In an aspect, the system configuration module 148 selects components 202 that satisfy goals and system requirements 201, and generates a system configurations list 206.

In an embodiment, explainable recommendation module 144 evaluates each system configuration according to the requirements and goals 201 to perform a requirements decomposition 207. In an aspect, requirements and goals 201 includes a specification document that specifies the high-level architecture and the system requirements for the design to be realized. In an embodiment, explainable recommendation module 144 executes a function for physical decomposition on the architecture to identify the constituent elements of the architecture. For example, requirements are decomposed into function and physical block representations that can be mapped to system components 202. In parallel, from the specification document, explainable recommendation module 144 constructs a requirements traceability chain to realize an effective requirements decomposition 207. The requirements decomposition is effective when all the requirements can be mapped to an identified functional or physical block representation of system components. In an aspect, the decomposition is effective on a condition that all requirements have to be related to a physical block through one or more "satisfy" relations (i.e., whether a requirement is satisfied by a certain block). Next, explainable recommendation module 144 estimates system performance for each configuration (step 208) using a requirements breakdown analysis based on overall performance of the system being a function of individual performance for each system configuration component. The parameters described in the requirement specification are extracted (e.g., overall system efficiency) and the attributes of the decomposed block (e.g., battery efficiency, weight, input ratings, output ratings, geometry, other physical and performance characteristics) are tracked as contributing to the requirement through some parametric equations or simulations. In an aspect, explainable recommendation module 144 implements a machine learning based model trained to predict performance of system configurations based on inputs of component specifications and using network parameters (weights) optimized for design goals and requirements. The performance prediction output is contributing system component performance values 209, where each component of the system design configuration is rated according to a score value that represents the impact on or contribution to the performance of the overall system. In an aspect, the performance values 209 may be added as data fields in the list of system configurations 206.

In an embodiment, explainable recommendation module 144 ranks the system configurations at 215 based on the performance values 208. The output of the ranking step 215 includes the ranked system configurations 216, minimum and maximum system performance values 217. For example, the list of system configurations 206 may be sorted according to a representative performance value of the system design configuration (e.g., minimum performance value, or maximum system performance value). As an illustrative example, the system design display 331 in FIG. 3 presents system design configurations in order by highest minimum performance value 332. The minimum performance value of the system design configuration is defined by one or more of the components of the system having the lowest performance rating in the configuration (i.e., the weakest predicted performance contribution). The maximum performance value of the system design configuration is based on one or more of the components of the system having the highest predicted performance value. The actual performance value 335 for the system configuration, which is determined by a full simulation, is expected to be between the minimum performance value 332 and maximum performance value 334. For example, a system design for an aerial drone with ten components could be evaluated by a weight parameter of each component and the heavier components may have lower performance ratings than the lighter components based on their respective contribution to flight (e.g., propulsion) versus drag effect on the flight performance (e.g., gravity) of the overall system. Accordingly, the performance value of a system component does not describe the system component performance, but rather it represents the resulting system performance it enables or impacts. The estimated system performance is analyzed by taking all system performance goals and requirements into account with respect to each of the system components for a particular system configuration. In an embodiment, the maximum performance value of a system configuration 334 is determined by the highest performance value among system component(s) (e.g., 324), and the minimum performance value of a system configuration 324 is determined by the minimum performance value among the system component(s) (e.g., 322).

As shown in FIG. 3, minimum and maximum performance values 332 and 334 are presented on the dashboard 300 associated with the respective system design 321 display. Actual performance value 335 represents the result obtained from a full simulation of the system configuration data and is shown on the dashboard along with a prediction confidence value 340 generated by the full simulation tool. From such a presentation of information available upon completing a full simulation, the preliminary estimates 322, 324 for minimum and maximum system performance can be compared side-by-side to the actual simulation results 335, 340. For each system configuration, the same type of performance information is associated with each system component.

Explainable recommendation module 144 ranks the system configurations, shown as system designs 331 presented on dashboard 300, sorted from top to bottom according to system performance values. In an embodiment, ranking can be according to one or more of several performance parameters, such as achievable system performance (e.g., the "maximum performance" value 334), improvable system performance (e.g., "minimum performance" value 332), and evaluated system performance (e.g., "actual" system performance value 335 obtained from a full system simulation). System configurations are ranked to maximize system performance, so the system can further be optimized by redesign or replacement of one or more underperforming system components. For example, the top ranked system configuration according to the estimated system performance indicates which component is responsible for the minimum performance rating, such as rating 322, and can then be substituted by the user while viewing the dashboard, selecting an alternative version of the component rated as a higher performer, and a new system performance estimation can then be executed on the revised configuration. The minimum system performance can be improved by improving the performance of all system elements with a minimum performance rating, e.g., per redesign or per replacement. For the case in which the minimum performance of all system elements has the same system performance rating, the minimum performance is identical with the maximum performance.

For system elements which have an actual performance lower than the achievable system performance, explainable recommendation module 144 sends a request prompt to the user, shown as Request 325 indication button on dashboard 300, for a different system component with a higher actual performance. In an embodiment, the user can click on the Request button 325, and alternative components can be recommended by the explainable recommendation module 144 (e.g., in a pop-up window on the display, as a design recommendation 311, or as a string text in the dialog box 312). The recommendations can be based on evaluating the design specifications of the alternative components, prior system performance estimates with the alternative component, or a combination of both.

For all system elements which actual performance is equal to the achievable system performance, additional system components are listed with a lower performance in a ranked order, shown as alternative components 323 on dashboard 300. This may be useful in a case when the system configuration meets the goals 301 and requirements 302, however the user may have particular preferences for one or more alternative components based on one or more various factors. Providing such options to the user allows flexibility in the design process with assurance that alternative choices for the system configuration will still satisfy the goals and requirements for the performance of the overall system.

In an embodiment, top ranked system design configurations 331 as displayed on dashboard 300 are recommended to the user by explainable recommendation module 144 to be used for setup of full performance simulation.

Figure 4:
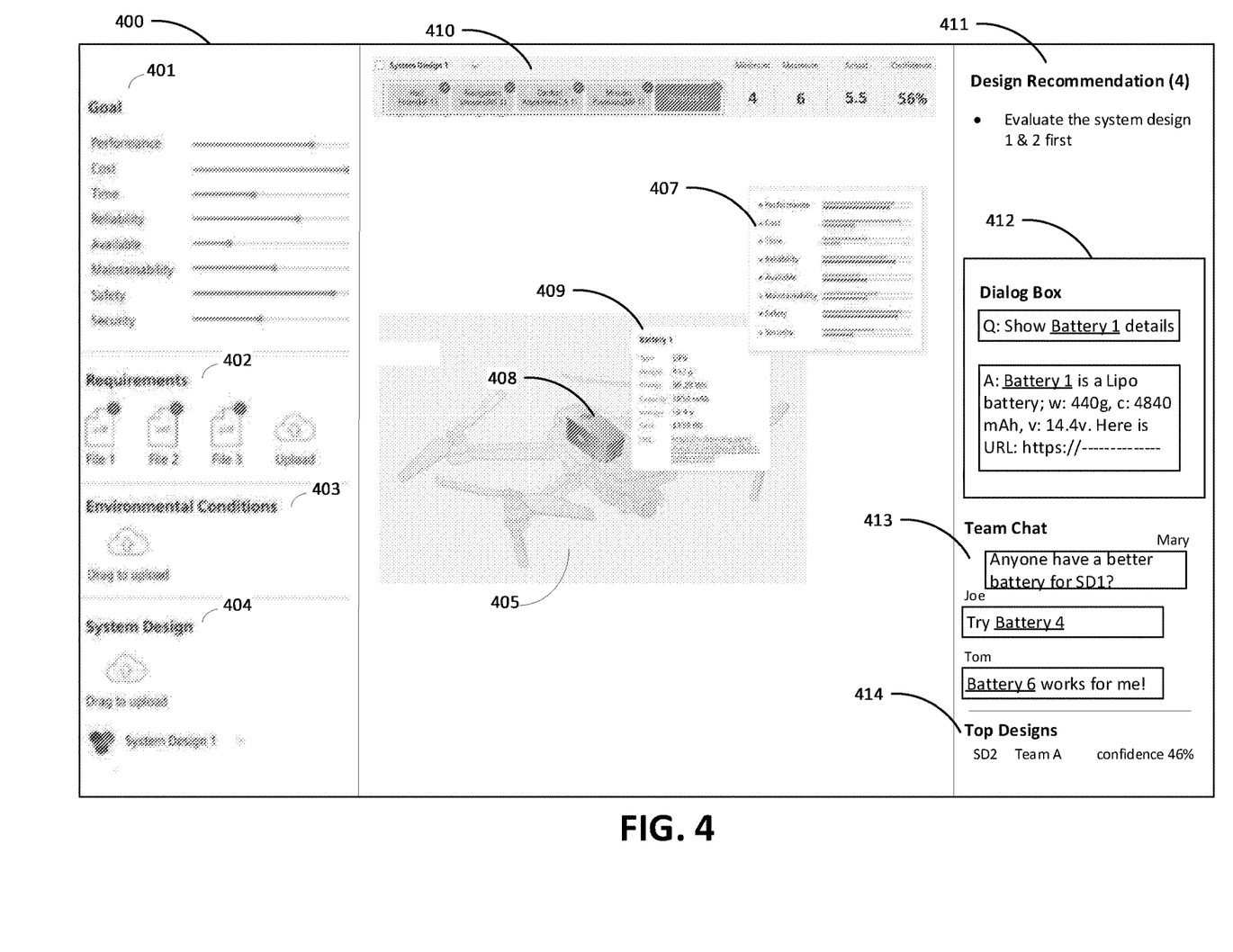
FIG. 4 shows an example of an alternate dashboard view including a graphical representation of the system configuration according to embodiments of this disclosure.

FIG. 4 shows an example of an alternate dashboard view including a graphical representation of the system configuration according to embodiments of this disclosure. Dashboard 400 is a graphical user interface that can be displayed to a user on a portion of a computer monitor for example. The functionality of the dashboard 400 includes providing an interactive GUI for a user with system design view information that is most important to the engineering design activity, allowing design activities that normally take several hours with conventional means to be performed in a matter of minutes. For example, design parameters and design components can be rapidly swapped within the system design view because critical contextual information is instantly viewable for any target component. In an embodiment, dashboard 400 may be integrated with an engineering application 112 as a separate screen view that can be toggled on and off from an engineering tool used for the target design. Alternatively, the dashboard 400 may be displayed on a first portion of the screen alongside of one or more engineering tools being displayed on a second portion of the screen. As shown, dashboard screen portions may include design goals 401, design requirements 402, environmental condition files 403, system design files 404, visual system design view 405, design metrics 407, target component view 408, target component details 409, system design performance bar 410, design recommendations 411, dialog box 412, team chat 413, and top ranked designs 414. Conversational dialog box 412 is part of the dashboard 400 display, allowing a user to type in a plain text string request for design view information, and to display a dialog response to the user with design view information extracted from the design repository, via the design bot operation. In addition to the dialog box feature, the design view is presented graphically as a system design 405 with the target component 408 related to the user design view request. For example, as shown, System Design 1 relates to an electric quadrofoil drone shown by visual system design view 405, and the target component 408 is a rendered battery related to the current session in dialog box 412. In an embodiment, the GUI engine 113 in conjunction with one or ore AI modules 140-144 generates the dashboard 400 with contextual information for system design view objects, whereby components, such as Battery 1 shown in FIG. 4, are displayed in text with a contextual indicator (e.g., bold, special color, underlined) to indicate to the user that contextual information is accessible for this component. For example, the contextual information for Battery 1 is presented in the dialog box 412 answer block as a textual string, and as an overlay in the visual system design view, shown as target component details 409. In addition, as any object is referenced within dialog box 412, team chat portion 413, or elsewhere in the dashboard 400, the object is displayed with the contextual indicator allowing the user to manipulate the object in various ways. For example, Battery 4 in team chat 413 can be dragged into the visual system design view 405, and the AI modules 140-144 will integrate the different battery into the system design, including updating the dashboard 400 with the target component display 408 and details 409 for Battery 4.

The Goal portion 401 in dashboard 400 is an interactive display of technical design parameters allowing a user to input parameter settings for the system design, and recording the settings in a visual manner, such as slide bars shown in FIG. 4 which can be adjusted using a pointer device (e.g., mouse or via touch screen). Requirement files 402 are present on dashboard 400 to indicate the currently uploaded files containing design requirements for the active system design. Environmental condition files 403 portion of dashboard 400 shows currently uploaded files for the system design as input for system design analysis, such as expected environmental conditions in which the system design may encounter and will be required to perform satisfactorily. System design files 404 shows currently uploaded system design files containing the data for various system designs accessible to the user through dashboard 400. includes both the rendered target component 408 and a display of component properties 409, which may include, but is not limited to: type, weight, energy, capacity, voltage, cost and a URL link for further information.

When the conversational dialog system responds with a reference to a system element (e.g. "system design 1", "Battery 1"), the system element is accessible as a virtual object, and can be handled as an object, including, but not limited to the following object operations: view, open, close, save, save as, send, share, move, cut'n'paste, copy'n'paste, delete, modify, rank, sort, drag'n'drop. For example, as shown in FIG. 4, system element Battery 1 can be handled as an object, and by a selection operation (e.g., point and click with a computer mouse), details and characteristics are viewed as target object details 409, and a visual representation is viewed as target component view 408.

System design views can be in various forms, depending on the context of the request. For example, the dashboard may display one or more of the following: performance and attributes of a target component and/or the system can be displayed on the dashboard, a visual display of the system zoomed in at the target component, plot of power consumption over time.

Figure 5:
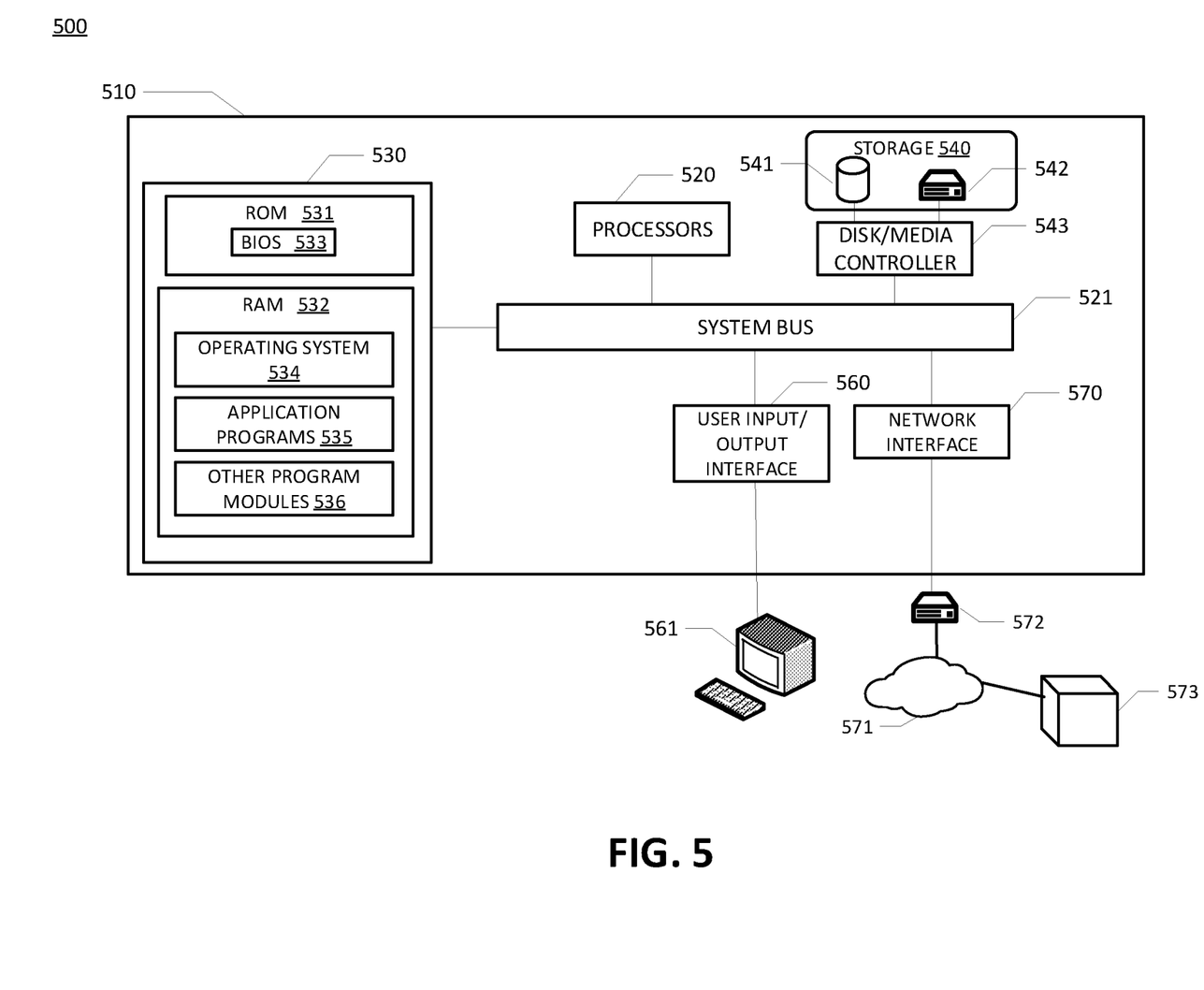
FIG. 5 illustrates an example of a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. In an embodiment, computing environment 500 corresponds to an engineering design system with a conversational dialog feature for efficient design development, in which the computer system 510 relates to a computer described below in greater detail.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application modules 535, and other program modules 536. Application modules 535 may include aforementioned modules described for FIG. 1 or FIG. 2 and may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may include a user input/output interface module 560 to process user inputs from user input devices 561, which may comprise one or more devices such as a keyboard, touchscreen, tablet and/or a pointing device, for interacting with a computer user and providing information to the processors 520. User interface module 560 also processes system outputs to user display devices 562, (e.g., via an interactive GUI display).

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 573. The network interface 570 may enable communication, for example, with other remote devices 573 or systems and/or the storage devices 541, 542 via the network 571. Remote computing device 573 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 573). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 573, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for performance-based system design configuration generation as preprocessing for optimal system performance simulation, the system comprising:
   a processor; and
   a non-transitory memory having stored thereon modules executed by the processor, the modules comprising:
   a design configuration module configured to receive seed designs, a specification of requirements for a system design, and user defined goals for the system, and to generate a set of system design configurations, each system design configuration comprising a unique set of components that satisfy system goals and system requirements;
   an explainable recommendation module configured to:
   perform a requirement decomposition that decomposes requirements into function and physical block representations that are mappable to the components;
   determine, for each system design configuration, an estimated system performance value associated with each component of the system design configuration,
   wherein the value represents the component-based contribution to performance of the system configuration based on a simulation model; and
   rank the list of system configurations according to system performance values; and
   a user interface module configured to communicate information exchanged between a graphical user interface and the explainable recommendation module, wherein the graphical user interface displays a design dashboard that presents the system configurations in rank order, and for each system configuration, the estimated system performance value for each of the system configuration components;
   wherein the top ranked system configurations are recommended to the user for performance simulation setup;
   wherein the explainable recommendation module implements a machine learning based model trained to predict performance of system configurations.

2. The system of claim 1, wherein the dashboard includes component representations that are accessible as a virtual object to be handled on the graphical user interface in various operations.

3. The system of claim 1, wherein the explainable recommendation module is further configured to:
   receive a replacement component selection at the graphical user interface for one of the system configuration components having a minimum performance value;
   reevaluate the system configuration with the replacement component selection to determine new system performance values.

4. The system of claim 3, wherein the explainable recommendation module is further configured to:
   send a request prompt to the user on the graphical user interface as a request for the replacement component, wherein the replacement component has an actual performance value determined by a simulation.

5. The system of claim 1, wherein the explainable recommendation module is further configured to:
   provide alternative components for the system configuration having lower system performance values to assist user selected substitutions.

6. A method for performance-based system design configuration generation as preprocessing for optimal system performance simulation, comprising:
   receiving seed designs, a specification of requirements for a system design, and user defined goals for the system;
   generating a set of system design configurations, each system design configuration comprising a unique set of components that satisfy system goals and system requirements;
   performing a requirement decomposition that decomposes requirements into function and physical block representations that are mappable to the components;
   determining, for each system design configuration, an estimated system performance value associated with each component of the system design configuration,
   wherein the value represents the component-based contribution to performance of the system configuration based on a simulation model;
   ranking the list of system configurations according to system performance values; and displaying a design dashboard on a graphical user interface that presents the system configurations in rank order, and for each system configuration, the estimated system performance value for each of the system configuration components;
   wherein the top ranked system configurations are recommended to the user for performance simulation setup;
   further comprising training a machine learning based model to predict performance of system configurations.

7. The method of claim 6, wherein the dashboard includes component representations that are accessible as a virtual object to be handled on the graphical user interface in various operations.

8. The method of claim 6, further comprising:
   receiving a replacement component selection at the graphical user interface for one of the system configuration components having a minimum performance value;
   reevaluating the system configuration with the replacement component selection to determine new system performance values.

9. The method of claim 8, further comprising:
   sending a request prompt to the user on the graphical user interface as a request for the replacement component, wherein the replacement component has an actual performance value determined by a simulation.

10. The method of claim 6, further comprising:
    providing alternative components for the system configuration having lower system performance values to assist user selected substitutions.

* * * * *